US012773944B2

(12) United States Patent
Hamanaka et al.

(10) Patent No.: US 12,773,944 B2
(45) Date of Patent: Oct. 27, 2026

(54) CONTROL APPARATUS FOR HEADLAMP, CONTROL METHOD FOR HEADLAMP, AND HEADLAMP SYSTEM

(71) Applicant: STANLEY ELECTRIC CO., LTD., Tokyo (JP)

(72) Inventors: Yoshio Hamanaka, Tokyo (JP); Ryotaro Owada, Tokyo (JP); Takeshi Kambara, Tokyo (JP); Ken Nishioka, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 77 days.

(21) Appl. No.: 19/036,916

(22) Filed: Jan. 24, 2025

(65) Prior Publication Data

US 2025/0242747 A1 Jul. 31, 2025

(30) Foreign Application Priority Data

Jan. 25, 2024 (JP) ................................ 2024-009644

(51) Int. Cl.
*B60Q 1/14* (2006.01)
*B60Q 1/00* (2006.01)

(52) U.S. Cl.
CPC ........... *B60Q 1/143* (2013.01); *B60Q 1/0023* (2013.01); *B60Q 2300/056* (2013.01); *B60Q 2300/132* (2013.01); *B60Q 2300/41* (2013.01); *B60Q 2300/42* (2013.01); *B60Q 2300/45* (2013.01)

(58) Field of Classification Search
CPC .................. B60Q 1/143; B60Q 1/0023; B60Q 2300/056; B60Q 2300/132; B60Q 2300/41; B60Q 2300/42; B60Q 2300/45; B60Q 2300/40
See application file for complete search history.

(56) References Cited

U.S. PATENT DOCUMENTS

| | | | | |
|---|---|---|---|---|
| 10,654,402 | B2 | 5/2020 | Kambara | |
| 2016/0167566 | A1* | 6/2016 | Tanaka | F21S 41/143 315/82 |
| 2021/0162912 | A1* | 6/2021 | Spero | F21S 41/153 |
| 2021/0253021 | A1* | 8/2021 | Murase | B60Q 1/143 |

FOREIGN PATENT DOCUMENTS

| | | | | | |
|---|---|---|---|---|---|
| JP | 4715769 | B2 * | 7/2011 | | |
| JP | 4737113 | B2 * | 7/2011 | | |
| JP | 2012183875 | A * | 9/2012 | | F21S 41/698 |
| JP | 7048331 | B2 | 4/2022 | | |

* cited by examiner

*Primary Examiner* — Abdullah A Riyami
*Assistant Examiner* — Syed M Kaiser
(74) *Attorney, Agent, or Firm* — Kenealy Vaidya LLP

(57) ABSTRACT

A control apparatus for a headlamp in which irradiation lights of a left-side variable light distribution unit and a right-side variable light distribution unit are overlapped to form a combined irradiation light in front of a vehicle, where the control apparatus performs: to set a first and a second light dimming ranges in the irradiation range of each of the left-side and right-side variable light distribution units according to an object position; to set irradiation ranges of a first and a second correction light at the left and right corners of the lower end of a combined light dimming range configured to include the first and second light dimming ranges; and to provide control signals to the left-side and right-side variable light distribution units to realize the combined irradiation light including the first and second light dimming ranges, and the irradiation ranges of the first and second correction light.

9 Claims, 14 Drawing Sheets

32L (32R)

33

CONTROL APPARATUS FOR HEADLAMP, CONTROL METHOD FOR HEADLAMP, AND HEADLAMP SYSTEM

The present application claims priority under 35 U.S.C. 119 to Japanese patent application no. 2024-009644 filed on Jan. 25, 2024, the entire contents of which are incorporated herein by reference.

BACKGROUND

Technical Field

The present disclosure relates to a control apparatus for a headlamp, a control method for a headlamp, and a headlamp system.

Description of the Background Art

In recent years, technology has been developed that irradiates a high beam with a light dimming range (or a light shielding range, the same applies hereinafter) which corresponds to the positions of an object in front of a vehicle, such as an oncoming vehicle, a preceding vehicle, a pedestrian, a bicycle, road signs, etc. (Refer to Japanese Patent No. 7048331, for example.)

Such a high beam is also called an adaptive driving beam (ADB), and the light dimming range which corresponds to the object to be dimmed (including the object to be shielded, the same applies hereinafter) can be dimmed and the high beam can be maintained outside the light dimming range, thereby contributing to improving visibility ahead of the vehicle.

However, when ADB function is used to set a light dimming range for the right and left lamps in relation to the object to be dimmed, a triangular shape illuminance unevenness (an area irradiated by light from only one lamp) occurs at the corners of the light dimming range due to the difference in the relative angle between the positions of the left and right lamps and the object. Such illuminance unevenness has poor appearance and can cause the driver to feel uncomfortable.

In a specific aspect, it is an object of the present disclosure to reduce illuminance unevenness that occurs due to the difference in the relative angle between an object to be dimmed and the positions of the left and right lamps when the light dimming range is set using ADB function for the right and left lamps with respect to the object to be dimmed.

SUMMARY (1) A control apparatus for a headlamp according to one aspect of the present disclosure is a control apparatus having a left-side variable light distribution unit and a right-side variable light distribution unit respectively disposed on left and right sides of the front of a vehicle, in which irradiation lights formed by the left-side variable light distribution unit and the right-side variable light distribution unit overlap in front of the vehicle to form a combined irradiation light in front of the vehicle, the control apparatus including: a forward monitoring sensor whose function is to detect an object present in front of the vehicle, and a controller connected to the headlamp and the forward monitoring sensor and controls the operation of the headlamp, where the controller is configured to perform: in accordance with the position of the object detected by the forward monitoring sensor, to set a first light dimming range in an irradiation range of the left-side variable light distribution unit, and to set a second light dimming range in an irradiation range of the right-side variable light distribution unit; to set an irradiation range of a first correction light in the left corner of the lower end of a first combined light dimming range that is configured as a range including the first light dimming range and the second light dimming range at a position closer to the vehicle than the object, and to set an irradiation range of a second correction light in the right corner of the lower end of the first combined light dimming range; and to provide control signals to the left-side variable light distribution unit and the right-side variable light distribution unit of the headlamp to realize the combined irradiation light which includes the first light dimming range, the second light dimming range, the irradiation range of the first correction light, and the irradiation range of the second correction light.

(2) An control method for a headlamp according to one aspect of the present disclosure is a control method performed by a controller to control the headlamp having a left-side variable light distribution unit and a right-side variable light distribution unit respectively disposed on left and right sides of the front of a vehicle, in which irradiation lights formed by the left-side variable light distribution unit and the right-side variable light distribution unit overlap in front of the vehicle to form a combined irradiation light in front of the vehicle, where the controller is configured to perform: in accordance with the position of an object present in front of the vehicle, to set a first light dimming range in an irradiation range of the left-side variable light distribution unit, and to set a second light dimming range in an irradiation range of the right-side variable light distribution unit; to set an irradiation range of a first correction light in the left corner of the lower end of a first combined light dimming range that is configured as a range including the first light dimming range and the second light dimming range at a position closer to the vehicle than the object, and to set an irradiation range of a second correction light in the right corner of the lower end of the first combined light dimming range; and to provide control signals to the left-side variable light distribution unit and the right-side variable light distribution unit of the headlamp to realize the combined irradiation light which includes the first light dimming range, the second light dimming range, the irradiation range of the first correction light, and the irradiation range of the second correction light.

(3) A headlamp system according to one aspect of the present disclosure is a headlamp system including: the control apparatus according to the above described (1), and a headlamp capable of variable light distribution which is connected to the control apparatus.

According to the above configurations, it is possible to reduce illuminance unevenness that occurs due to the difference in the relative angle between an object to be dimmed and the positions of the left and right lamps when the light dimming range is set using ADB function for the right and left lamps with respect to the object to be dimmed.

DESCRIPTION OF THE PREFERRED EMBODIMENTS

Figure 1A:
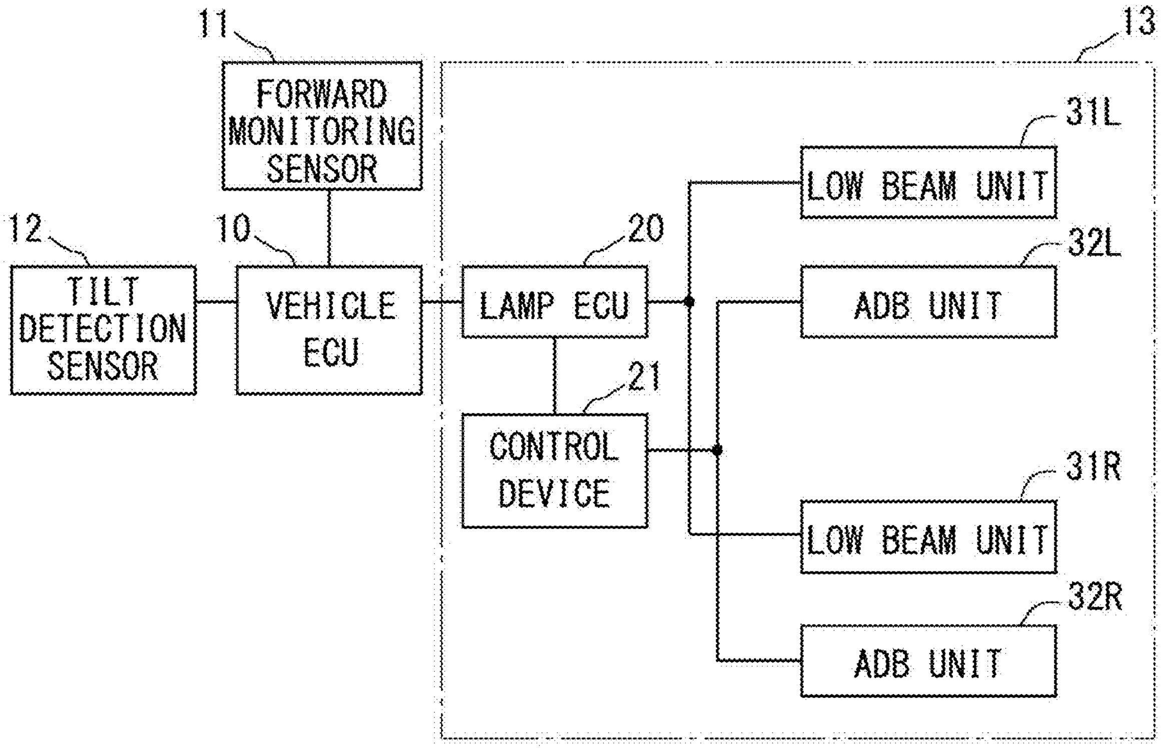
FIG. 1A is a diagram showing the configuration of a headlamp system according to one embodiment.

FIG. 1A is a diagram showing the configuration of a headlamp system according to one embodiment. The headlamp system shown in the diagram is configured to include a vehicle ECU (Electronic Control Unit) 10, a forward monitoring sensor 11, a tilt detection sensor 12, and a lamp 13. This headlamp system is installed in a vehicle and is used to irradiate the area in front of the vehicle.

Vehicle ECU 10 is used to control various operations in the vehicle. Vehicle ECU 10 is connected to each of forward monitoring sensor 11 and tilt detection sensor 12. For example, vehicle ECU 10 detects the operation state of a lamp switch (not shown) installed near the driver's seat of the vehicle, and sends a control signal according to the operation state to a lamp ECU (Electronic Control Unit) 20 of lamp 13. Further, vehicle ECU 10 also sends a control signal including the detection results by forward monitoring sensor 11 and the detection results by tilt detection sensor 12 to a lamp ECU 20.

Forward monitoring sensor 11 detects the position, size, type, etc. of an object in front of the vehicle. The object and its type to be detected include, for example, a preceding vehicle, an oncoming vehicle, a pedestrian, a bicycle, a road sign, an obstacle, etc. As one example, forward monitoring sensor 11 can be configured using a camera that captures the space in front of the vehicle, and an information processing device such as an image processor that determines the position, etc. of an object by performing image processing using the image captured by the camera. Here, forward monitoring sensor 11 may be, for example, an optical distance measuring sensor such as LiDAR, or a radar or ultrasonic sensor. In the present embodiment, as one example, a case will be described in which a preceding vehicle and an oncoming vehicle are the objects to be dimmed among the objects detected by forward monitoring sensor 11, but other objects such as a pedestrian can also be the object.

Tilt detection sensor 12 detects tilt of the vehicle in the pitch, roll, and yaw directions. Here, tilt detection sensor 12 should be capable of at least detecting tilt in the pitch direction (forward or rearward direction). As tilt detection sensor 12, for example, an acceleration sensor, gyro sensor, height sensor, etc. can be used.

Lamp 13 emits light to irradiate the space in front of the vehicle, and includes lamp ECU 20, a control device 21, low beam units 31L, 31R, and ADB units 32L, 32R.

Lamp ECU 20 controls the overall operation of lamp 13. Specifically, lamp ECU 20 receives a control signal sent from vehicle ECU 10, and controls the operation of each low beam unit 31L, 31R in accordance with the operation state of the lamp switch indicated by the control signal. Further, lamp ECU 20 also generates a control signal for operating each of the ADB units 32L, 32R in accordance with the operation state of the lamp switch indicated by the control signal received from vehicle ECU 10, and provides the control signal to control device 21.

Control device 21 generates a drive signal for operating each of the ADB units 32L, 32R based on the control signal provided from lamp ECU 20, and outputs the drive signal to each of the ADB units 32L, 32R.

Each low beam unit 31L, 31R is used to irradiate a low beam (passing beam) to the space in front of the vehicle. Low beam unit 31L is installed on the front left side of the vehicle, and low beam unit 31R is installed on the front right side of the vehicle. The light irradiated to the front of the vehicle from each of the low beam units 31L and 31R are combined to form a low beam.

Each of the ADB units 32L, 32R emits a high beam to the space in front of the vehicle. ADB unit 32L is installed on the front left side of the vehicle, and ADB unit 32R is installed on the front right side of the vehicle. In other words, ADB unit 32L is a left-side variable light distribution unit (left-side lamp), and ADB unit 32R is a right-side variable light distribution unit (right-side lamp). A high beam is formed by the overlapping of the irradiation lights formed by each of the ADB units 32L, 32R in front of the vehicle. When an object such as a preceding vehicle is present, an adaptive driving beam (combined irradiation light) is formed by dimming (or shielding) the area corresponding to the object within the high beam irradiation range.

Vehicle ECU 10 described above has a light distribution pattern setting function. Specifically, vehicle ECU 10 sets a light dimming range (or light shielding range) and a light irradiation range of the ADB function according to the position of a forward vehicle (preceding vehicle or oncoming vehicle) detected by forward monitoring sensor 11. Further, vehicle ECU 10 sets an irradiation range of a correction light that is irradiated to the corners of the light dimming range. Details of the correction light will be described later.

Lamp ECU 20 described above has a function of generating a control signal for causing each of the ADB units 32L, 32R to form an irradiation light according to the light distribution pattern set by vehicle ECU 10, and providing the control signal to each of the ADB units 32L, 32R.

Here, in the present embodiment, the "controller" is configured to include vehicle ECU 10, lamp ECU 20, and control device 21. However, each function of vehicle ECU 10, lamp ECU 20, and control device 21 may be integrated into vehicle ECU 10, or may be integrated into lamp ECU 20, or may be integrated into control device 21.

Figure 1B:
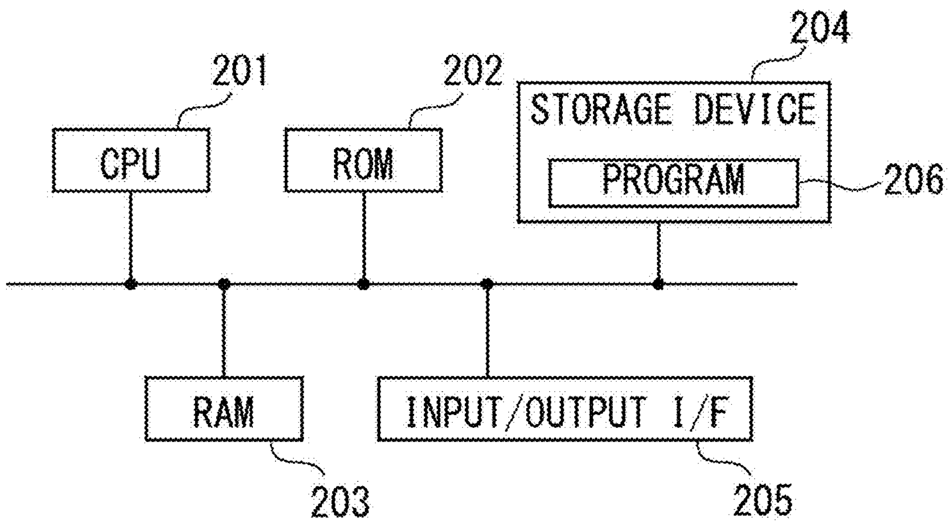
FIG. 1B is a diagram illustrating an example of a computer system.

FIG. 1B is a diagram illustrating an example of a computer system. The illustrated computer system can be configured using a computer system equipped with a processor (CPU: Central Processing Unit) 201, a ROM (Read Only Memory) 202, a RAM (Random Access Memory) 203, a storage device 204 such as a flash memory, and an input/output interface 205, etc. In this computer system, a program 206 stored in advance in the storage device 204 is read and executed by the processor, thereby enabling the system to perform various functions. Each of vehicle ECU 10, lamp ECU 20, and control device 21 described above can be realized using such a computer system, for example.

Figure 2A:
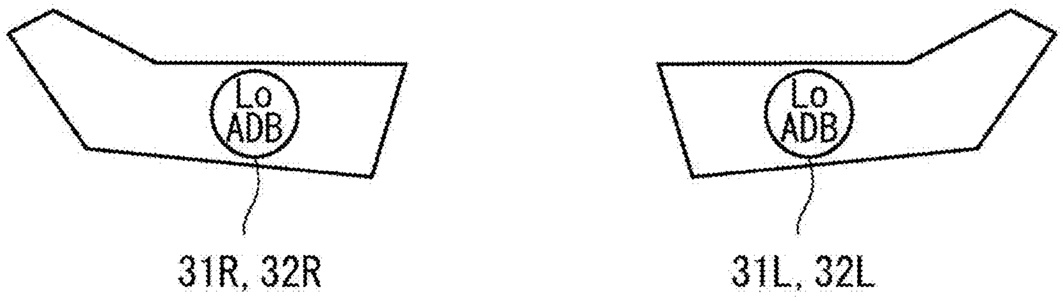
FIG. 2A and FIG. 2B are schematic front views showing configuration examples of a low beam unit and an ADB unit.
Figure 2B:
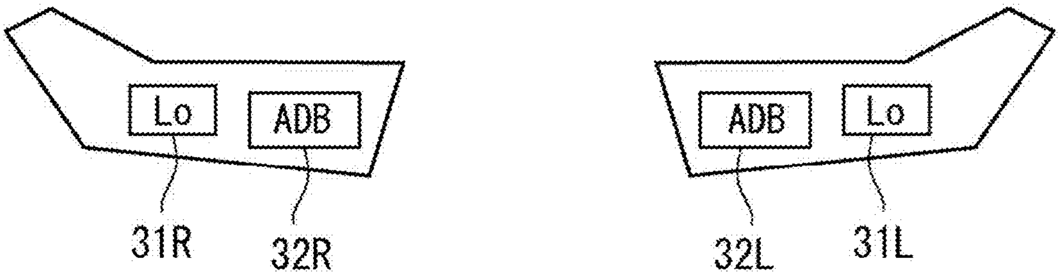

FIG. 2A and FIG. 2B are schematic front views showing configuration examples of a low beam unit and an ADB unit. Here, the units installed in the front of the vehicle are shown as viewed from the front of the vehicle. In the configuration example shown in FIG. 2A, low beam unit 31L and ADB unit 32L are integrally configured, and low beam unit 31R and ADB unit 32R are integrally configured. On the contrary, in the configuration example shown in FIG. 2B, low beam unit 31L and ADB unit 32L are separately configured, and low beam unit 31R and ADB unit 32R are separately configured. Here, note that these are only examples, and there are no limitations on the configuration of each low beam unit 31L, 31R and ADB units 32L, 32R as long as they have the function of irradiating a low beam and a high beam and have ADB function.

Figure 3A:
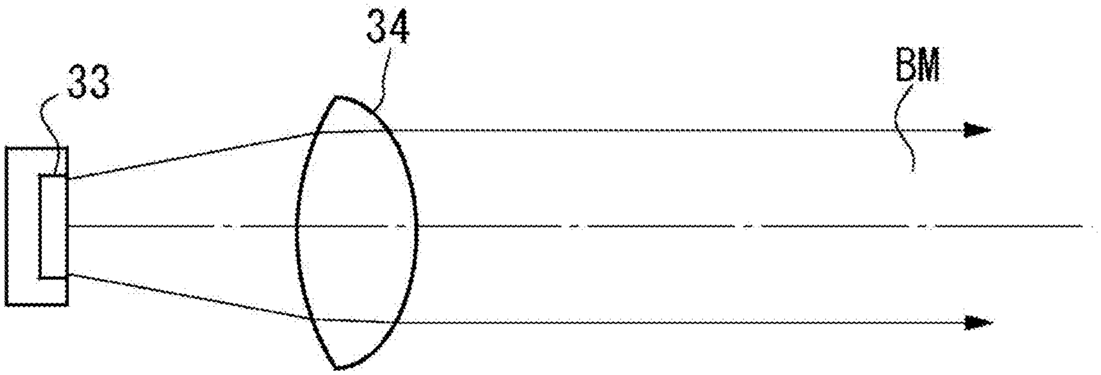
FIG. 3A is a schematic side view showing a configuration example of an ADB unit.
Figure 3B:
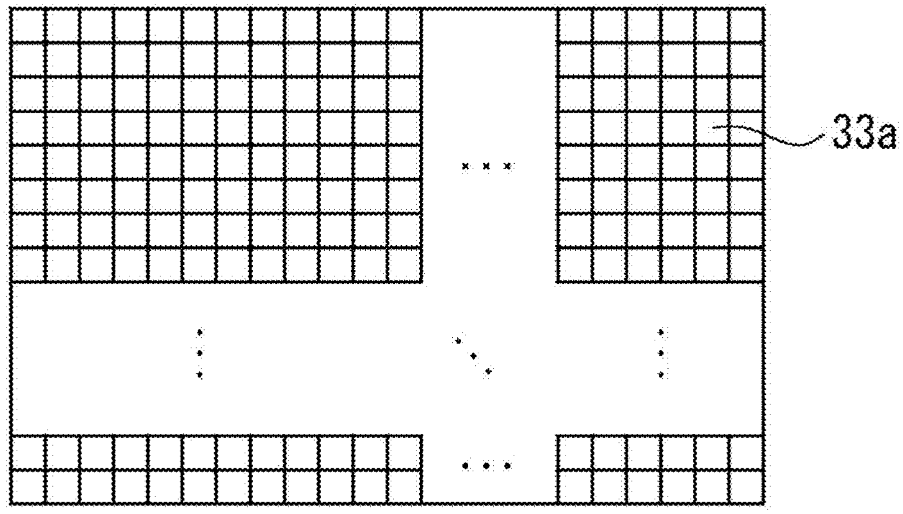
FIG. 3B is a schematic plane view of a configuration example of a light source.

FIG. 3A is a schematic side view showing a configuration example of an ADB unit. ADB unit 32L in the illustrated example is configured to include a light source 33 having a plurality of elements light-emitting arranged in two directions, and a lens 34 that focuses the light irradiated from light source 33 to form adaptive driving beam BM and irradiates the adaptive driving beam BM forward of the vehicle. Here, ADB unit 32R also has a similar configuration. As shown in FIG. 3B as a schematic plane view of a configuration example of light source 33, as one example, light source 33 has a plurality of light emitting elements 33*a* (e.g., several thousand to tens of thousands) arranged in two directions. Each light-emitting element 33*a* can be turned on and off individually. Each light-emitting element 33*a* can be an LED, for example.

Here, the configuration of ADB units 32L, 32R is not limited to that described above, and various types of publicly known ADB units can be used, such as an ADB unit that uses a liquid crystal element to control the light dimming range and light irradiation range, or an ADB unit that uses an optical deflector to scan the light emitted from a laser element and controls the light dimming range and light irradiation range by turning the laser element on and off at high speed.

Figure 4:
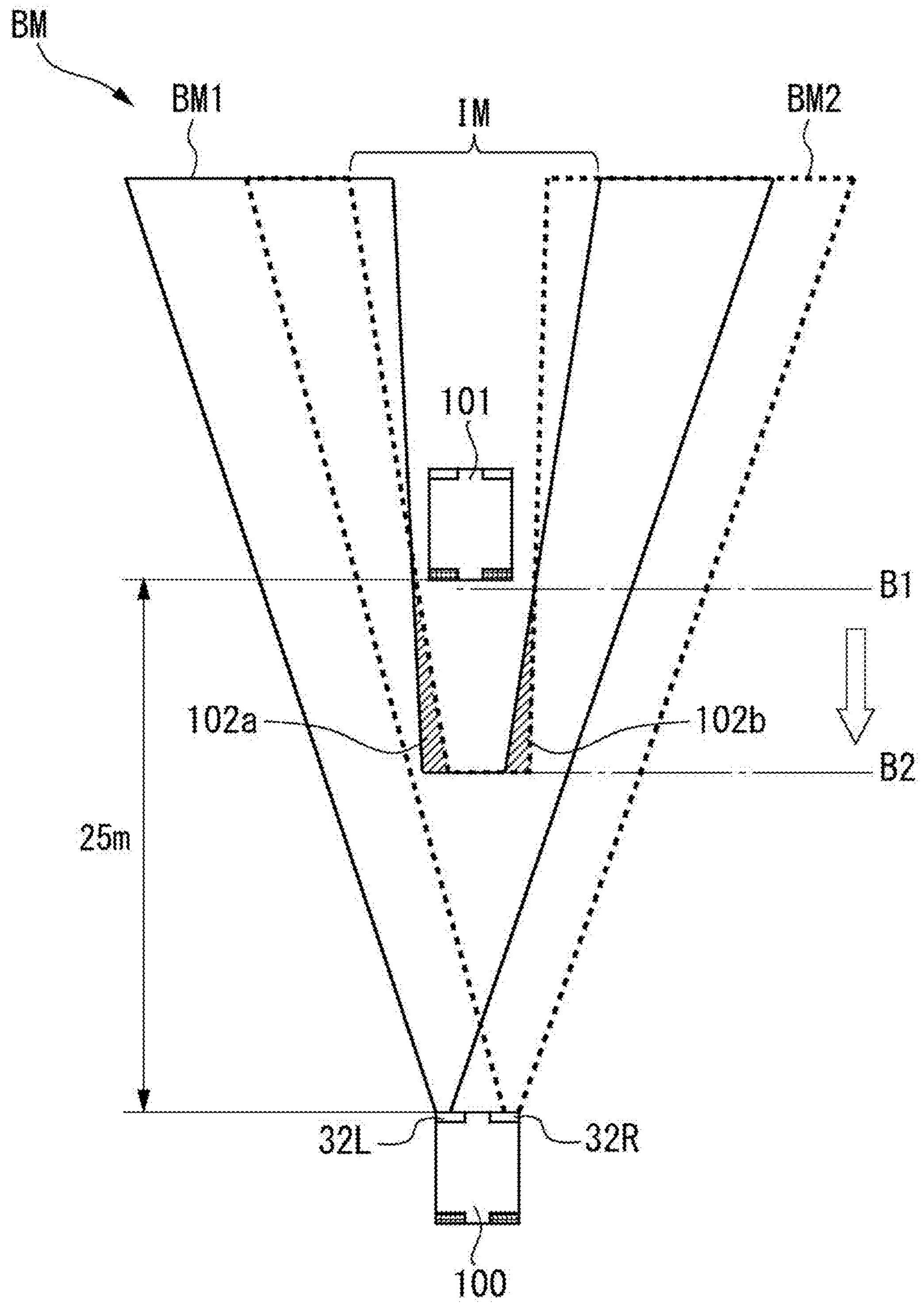
FIG. 4 is a schematic plane view for explaining an irradiation example of an adaptive driving beam.
Figure 5:
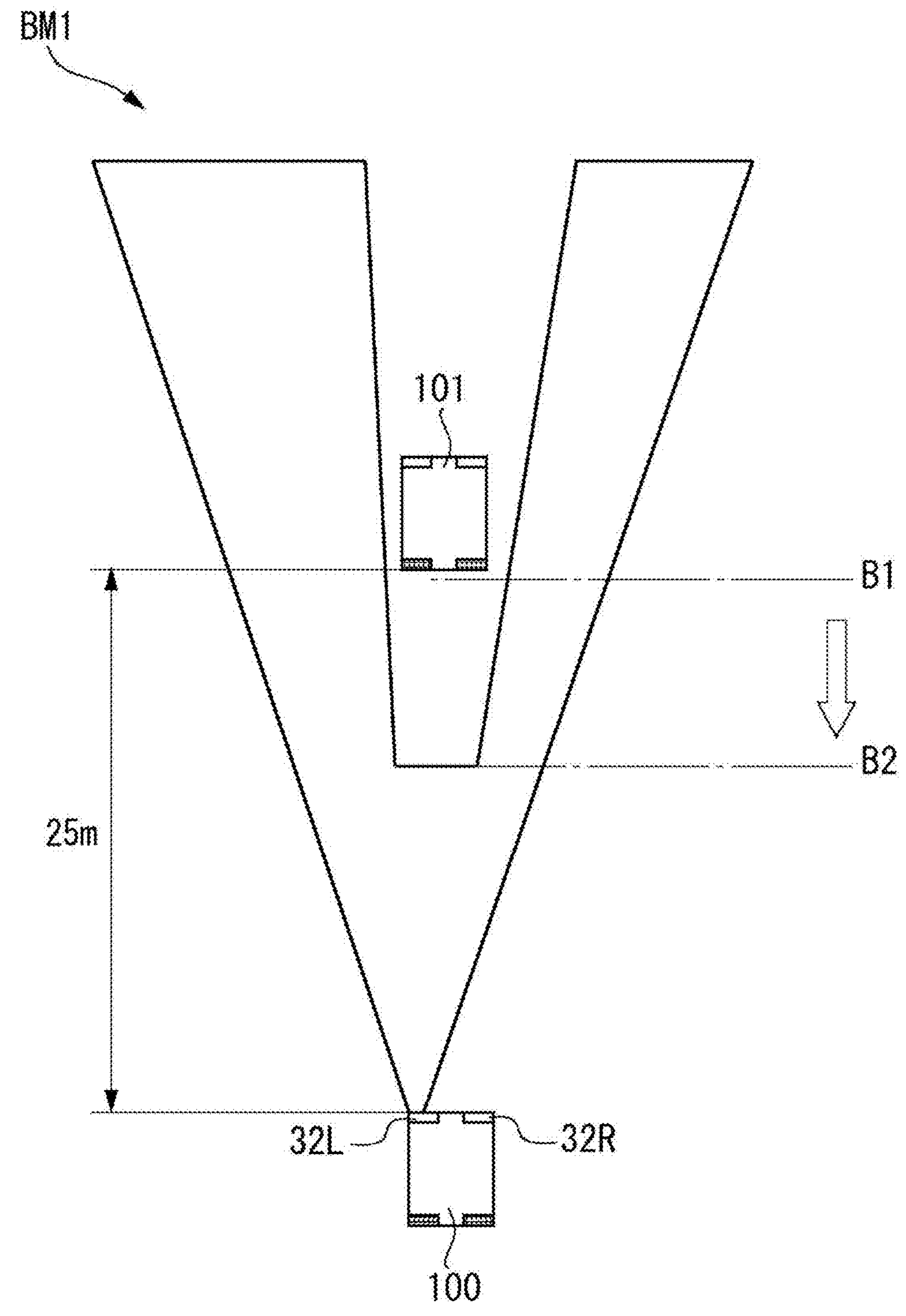
FIG. 5 is a schematic plane view showing adaptive driving beam BM1 irradiated by ADB unit 32L of the adaptive driving beams shown in FIG. 4.
Figure 6:
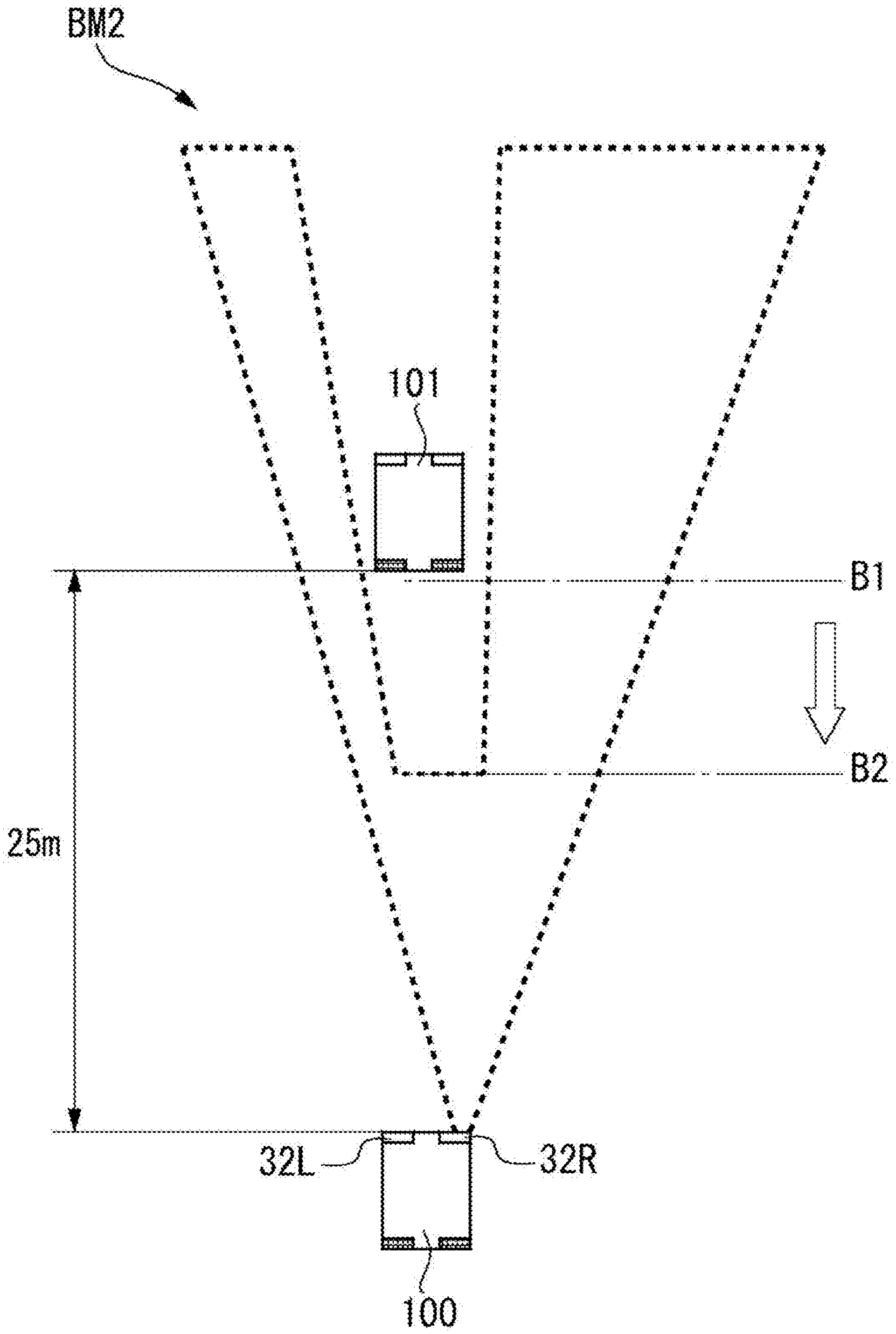
FIG. 6 is a schematic plane view showing adaptive driving beam BM2 irradiated by ADB unit 32R of adaptive driving beams shown in FIG. 4.

FIG. 4 is a schematic plane view for explaining an irradiation example of an adaptive driving beam. FIG. 5 is a schematic plane view showing adaptive driving beam BM1 irradiated by ADB unit 32L of the adaptive driving beams shown in FIG. 4. FIG. 6 is a schematic plane view showing adaptive driving beam BM2 irradiated by ADB unit 32R of the adaptive driving beams shown in FIG. 4. FIG. 4 through FIG. 6 show an overhead view of an own vehicle 100 and forward vehicle 101 from above, and schematically show the adaptive driving beam irradiated from own vehicle 100. FIG. 4 through FIG. 6 show, as an example, plane views in which the relative distance between own vehicle 100 and forward vehicle 101 is 25 m. Here, note that a preceding vehicle is shown as an example of forward vehicle 101, but the same applies to an oncoming vehicle.

When forward vehicle 101 is present, adaptive driving beam BM irradiated by ADB units 32L, 32R of own vehicle 100 is being set a combined light dimming range IM that corresponds to the position of forward vehicle 101. As shown in the figure, adaptive driving beam BM1 emitted from ADB unit 32L (shown by a solid line) and adaptive driving beam BM2 emitted from ADB unit 32R (shown by a dotted line) overlap in the space in front of own vehicle 100, causing adaptive driving beam BM to include the combined light dimming range IM to be irradiated in front of own vehicle 100.

Figure 7A:
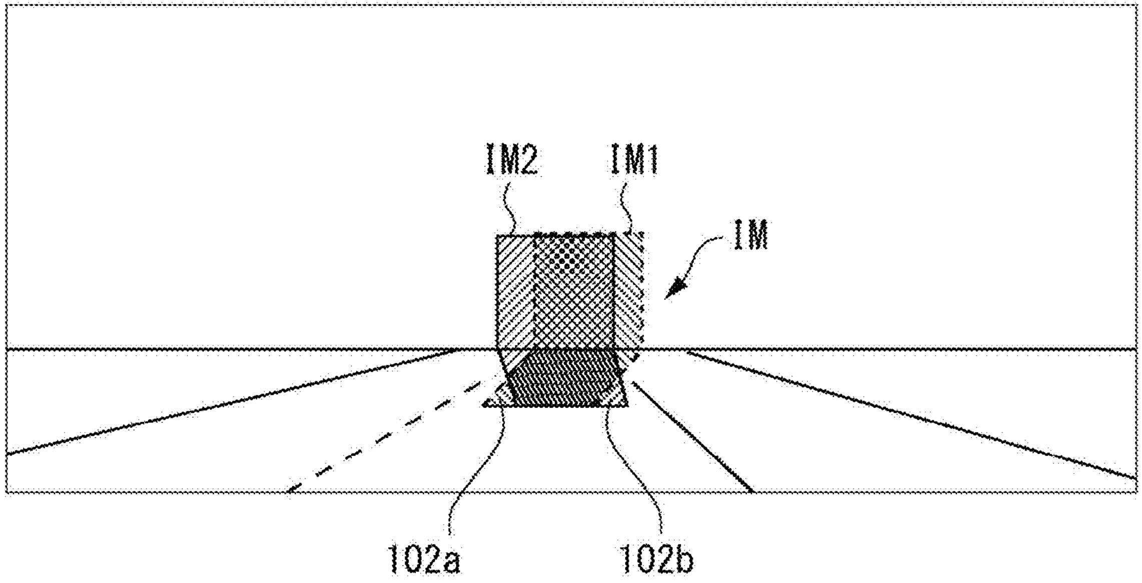
FIG. 7A is a diagram for explaining the occurrence of triangular shape illuminance unevenness on the road surface on the left and right of the lower end of the combined light dimming range when viewed forward from the own vehicle.

At this time, as shown in FIG. 4, area 102*a* is formed where adaptive driving beam BM2 is irradiated but adaptive driving beam BM1 is not irradiated, and area 102*b* is formed where adaptive driving beam BM1 is irradiated but adaptive driving beam BM2 is not irradiated. In these areas 102*a* and 102*b*, as shown in FIG. 7A as an example, triangular shape illuminance unevenness occurs on the road surface on the left and right of the lower end of the combined light dimming range IM when viewed forward from own vehicle 100.

Figure 7B:
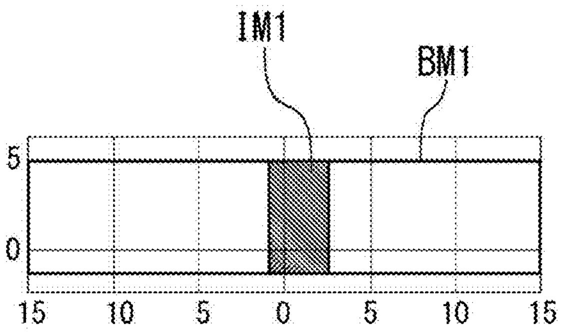
FIG. 7B is a diagram showing the shape of light dimming range IM1 of adaptive driving beam BM1 on a screen.
Figure 7C:
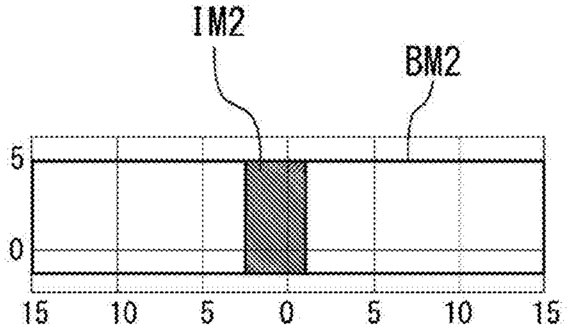
FIG. 7C is a diagram showing the shape of light dimming range IM2 of adaptive driving beam BM2 on a a virtual screen.

As shown in FIG. 7B and FIG. 7C, light dimming range IM1 (first light dimming range) of adaptive driving beam BM1 and light dimming range IM2 (second light dimming range) of adaptive driving beam BM2 are each approximately rectangular in shape on a virtual screen that is assumed to hang down in front of the vehicle. The shapes of light dimming ranges IM1, IM2 on the road surface are approximately trapezoidal when viewed by the driver of own vehicle 100, as shown in FIG. 7A. When attitude of own vehicle 100 is in a steady state, the lower end of the combined light dimming range IM is formed at the rear end of forward vehicle 101, so the illuminance unevenness in areas 102*a* and 102*b* is not very noticeable. However, when the lower end of the combined light dimming range IM changes from position B1 to position B2 due to the influence of acceleration or deceleration of own vehicle 100, a road surface inclination, or the like, the areas 102*a* and 102*b* are visually recognized as having illuminance unevenness.

Figure 8:
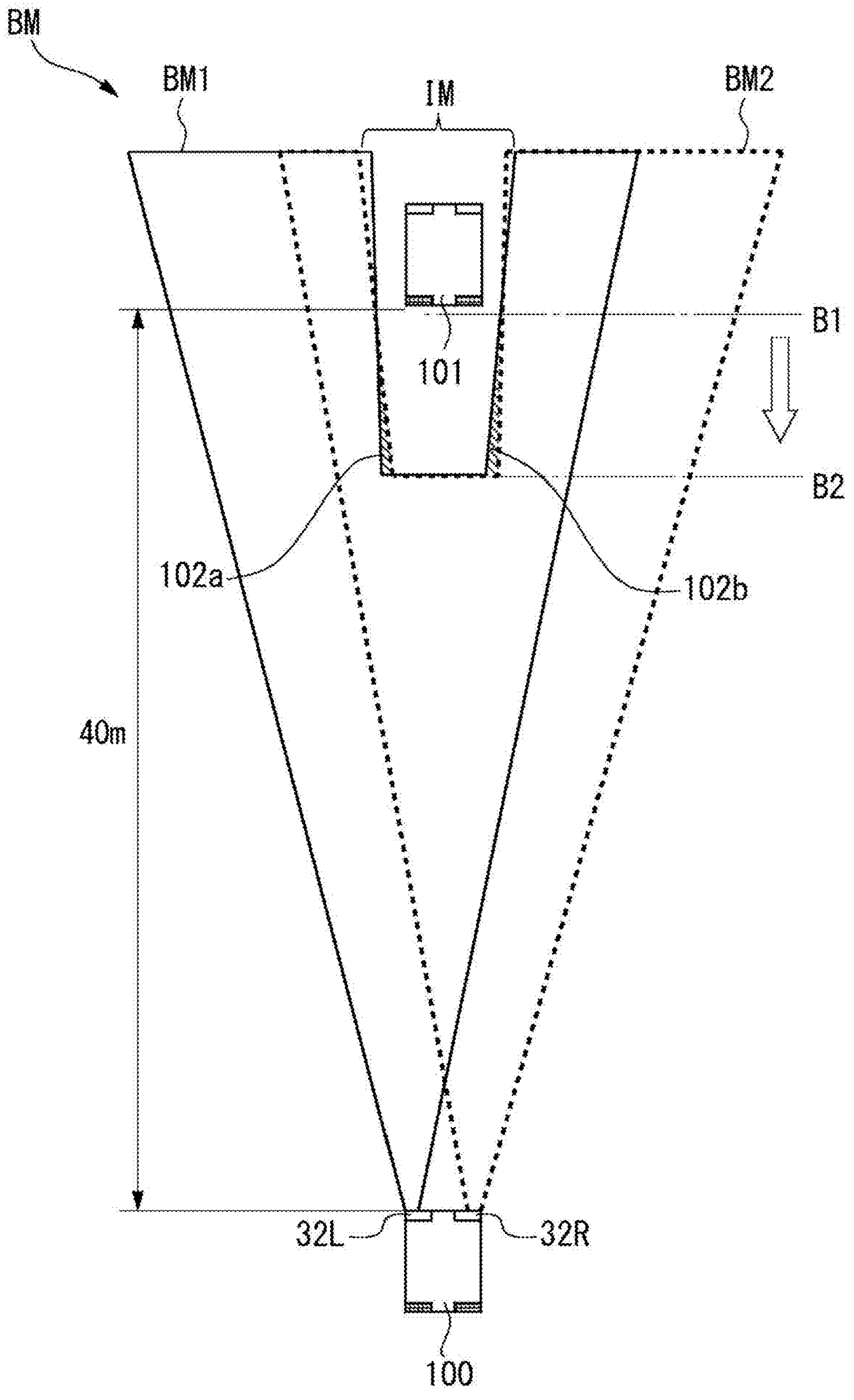
FIG. 8 is a schematic plane view for explaining an irradiation example of an adaptive driving beam.
Figure 9:
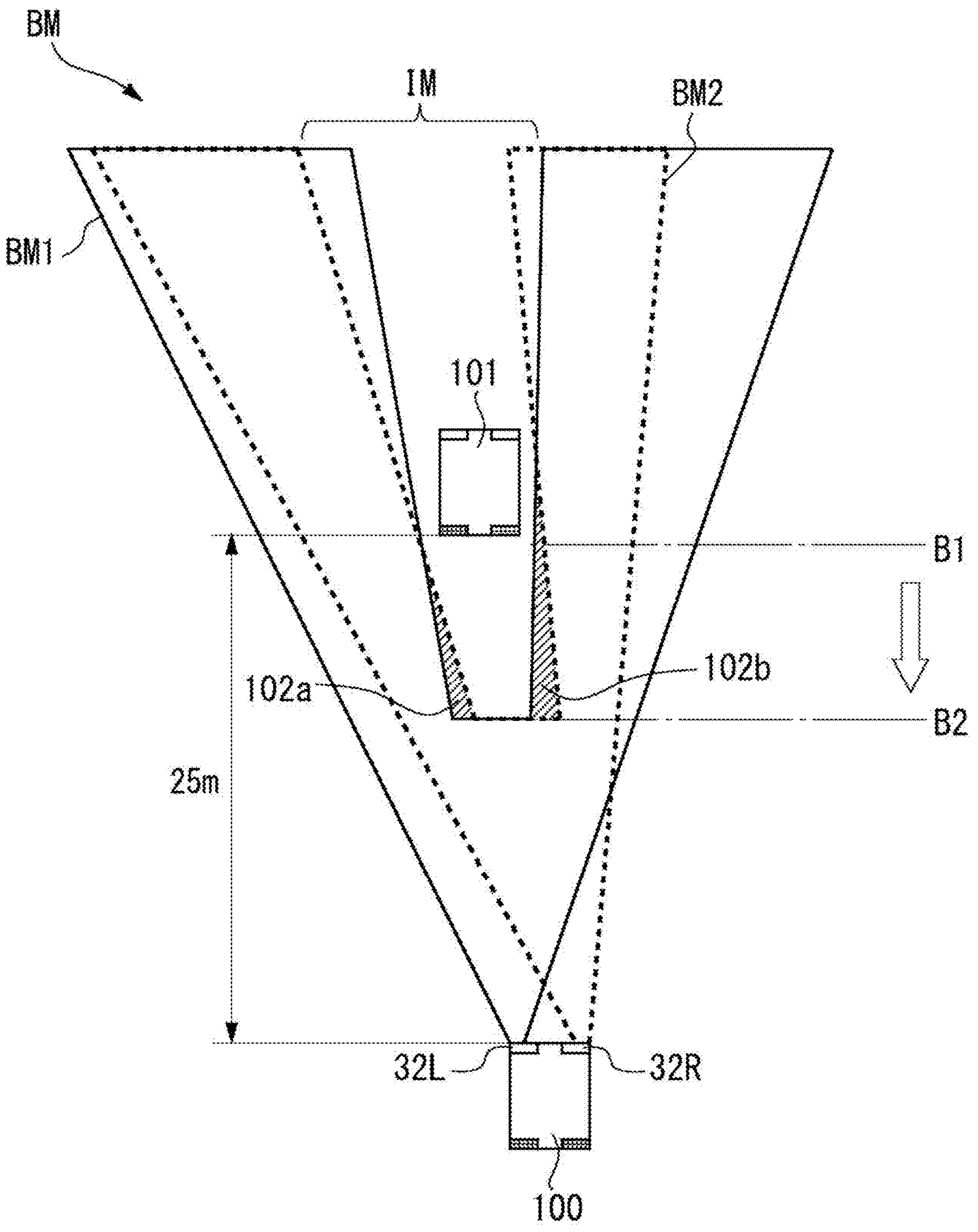
FIG. 9 is a schematic plane view for explaining an irradiation example of an adaptive driving beam.

Here, as shown in FIG. 8, when the relative distance between own vehicle 100 and forward vehicle 101 changes, the shape of areas 102*a*, 102*b* also changes accordingly, and the appearance of each of areas 102*a*, 102*b* when viewed from the front also changes. Similarly, as shown in FIG. 9, when the relative positional relationship between own vehicle 100 and forward vehicle 101 in the left-right direction (vehicle width direction) changes, the shape of areas 102*a*, 102*b* also changes accordingly, and the appearance of each of areas 102*a*, 102*b* when viewed from the front also changes.

Figure 10A:
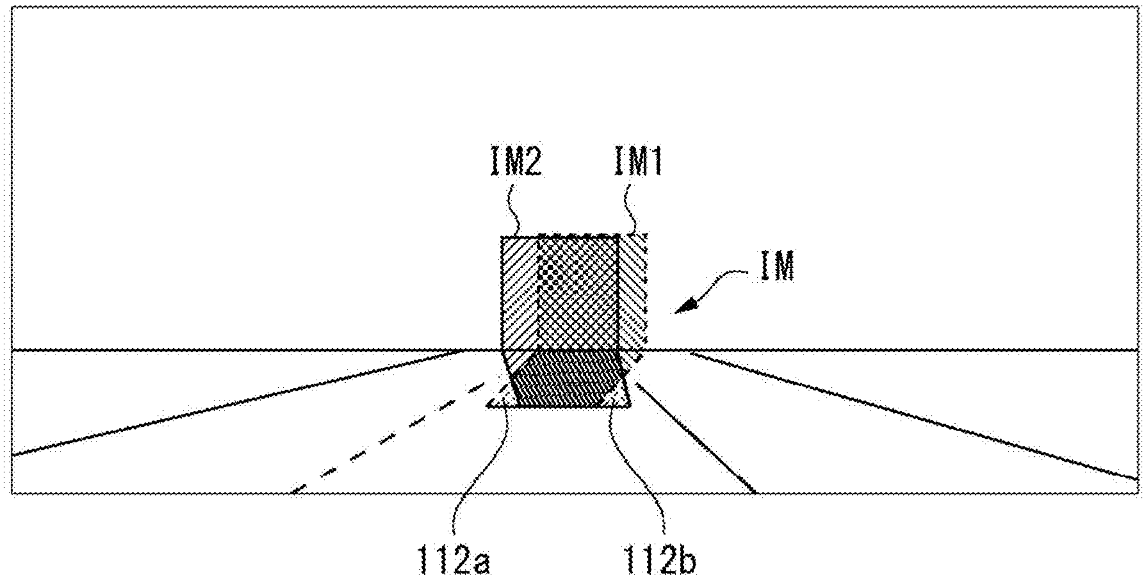
FIG. 10A is a diagram illustrating the shape on the road surface of a correction light that is irradiated to the left and right corners of the lower end of the combined light dimming range IM in the adaptive driving beam.
Figure 10B:
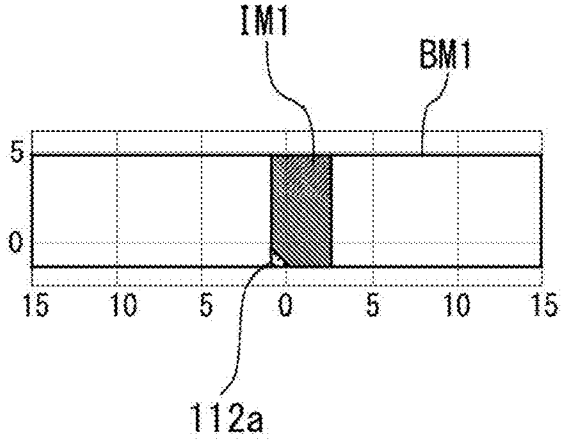
FIG. 10B is a diagram illustrating the shape of light dimming range IM1 of adaptive driving beam BM1 on a screen.
Figure 10C:
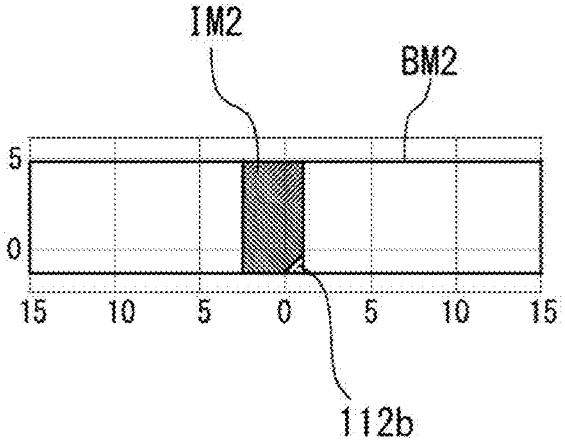
FIG. 10C is a diagram illustrating the shape of light dimming range IM2 of adaptive driving beam BM2 on a virtual screen.
Figure 10D:
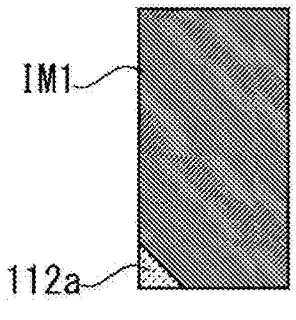
FIG. 10D is a partial enlarged view of light dimming ranges IM1, IM2.
Figure 10E:
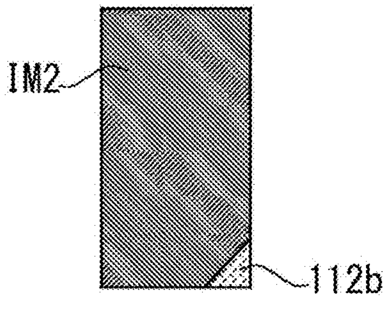
FIG. 10E is a partial enlarged view of light dimming range IM2.

FIG. 10A is a schematic diagram of the driver looking in the direction of travel from own vehicle 100, and is a diagram illustrating the shape on the road surface of a correction light that is irradiated to the left and right corners of the lower end of the combined light dimming range IM in the adaptive driving beam. FIG. 10B and FIG. 10C are diagrams illustrating the shapes of each light dimming range IM1, IM2 on a screen. FIG. 10D and FIG. 10E are partial enlarged views of each light dimming range IM1, IM2.

The combined light dimming range IM shown in FIG. 10A is configured as a range that includes light dimming ranges IM1, IM2. That is, the combined light dimming range IM is a range that includes a range in which either light dimming range IM1 or light dimming range IM2 exists, and a range in which light dimming range IM1 and light dimming range IM2 partially overlap.

As shown in each figure, in the present embodiment, correction light 112*a* (first correction light) and correction light 112*b* (second correction light) are irradiated to the left and right corners of the lower end of the combined light dimming range IM of adaptive driving beam BM at a position closer to the own vehicle than the forward vehicle (the object), thereby reducing illuminance unevenness in the left and right corners of the lower end of the combined light dimming range IM.

Here, note that in the figure, correction lights 112*a* and 112*b* are shown with patterns to make them easier to identify, but this does not necessarily represent the difference in light intensity (illuminance, brightness, luminous intensity, etc.) between them and other light irradiation ranges of adaptive driving beam BM. Further, the figure also illustrates an example in which, for each correction light 112*a* and 112*b*, the left and right corners of the combined light dimming range IM are cut in a straight line (a so-called chamfered shape) to obtain a correction light that is approximately triangular in front view. However, the shapes of correction lights 112*a* and 112*b* is not limited thereto, and for example, by cutting it in a curved line (so-called R processing), a correction light that is approximately triangular in front view may be obtained as well.

In the present embodiment, ADB unit 32L is controlled to irradiate correction light 112*a* to the lower left corner of light dimming range IM1 in the figure, and ADB unit 32R is controlled to irradiate correction light 112*b* to the lower right corner of light dimming range IM2 in the figure. Thus, this makes it possible to realize a combined light dimming range IM that is configured as a range that includes each light dimming range IM1, IM2, and adaptive driving beam BM that is a combined irradiation light that includes each correction light 112*a*, 112*b*.

Here, ADB unit 32L may irradiate correction light 112*b* along with correction light 112*a*. In this case, the illuminance of the portion of adaptive driving beam BM1 in ADB unit 32L that corresponds to correction light 112*b* may be increased by a factor of two, for example. Similarly, ADB unit 32R may irradiate correction light 112*a* along with correction light 112*b*. In this case, the illuminance of the portion of adaptive driving beam BM2 in ADB unit 32R that corresponds to correction light 112*a* may be increased by a factor of two, for example. However, in these cases, an adequate margin is required for the fluctuation range of light intensity in ADB unit 32L or ADB unit 32R, which may lead to increasing cost or a shortened lifespan of light source 33 due to increasing load on light source 33. Or there is a possibility of design difficulties. From these perspectives, as described above, it is more preferable to irradiate correction light 112*a* from ADB unit 32L to an area that has been previously irradiated only with irradiation light by ADB unit 32R, and irradiate correction light 112*b* from ADB unit 32R to an area that has been previously irradiated only with irradiation light by ADB unit 32L.

Figure 11A:
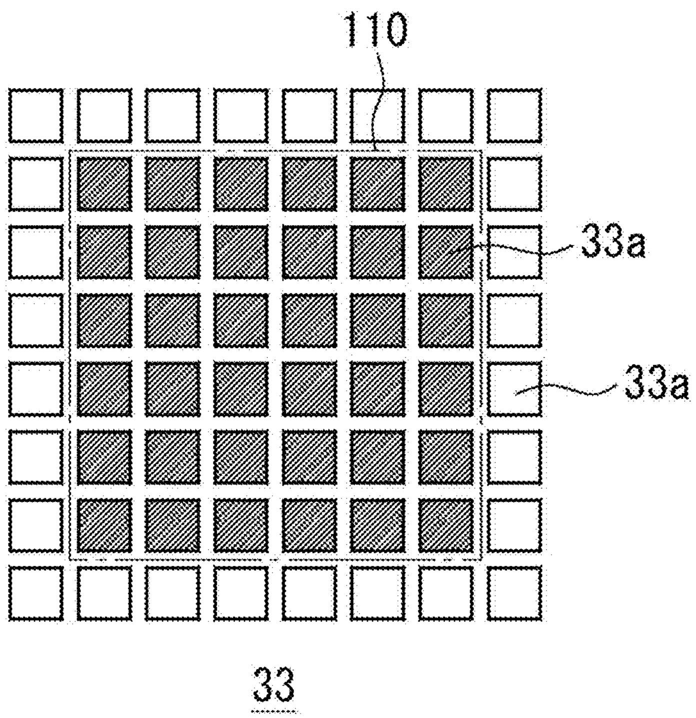
FIG. 11A and FIG. 11B are diagrams for explaining an example of light source control to realize a correction light.
Figure 11B:
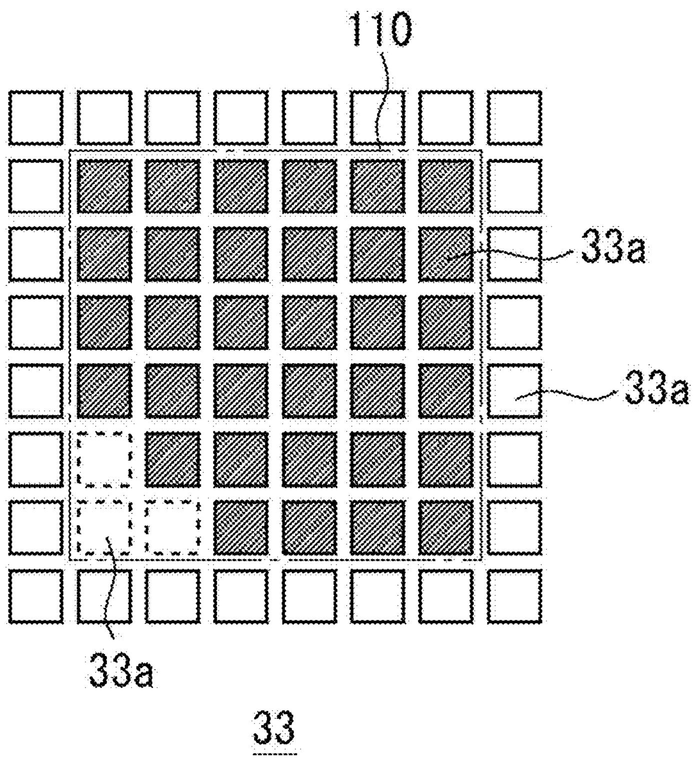

FIG. 11A and FIG. 11B are diagrams for explaining an example of light source control to realize a correction light. Here, note that while an example of a method for realizing correction light 112*a* of light dimming range IM1 is illustrated, correction light 112*b* of light dimming range IM2 can b realized in a similar manner. FIG. 11A and FIG. 11B show a partially enlarged view of light source 33 in ADB unit 32L.

When correction light 112*a* is not taken into consideration, in light source 33 of ADB unit 32L, light-emitting elements 33*a* to be dimmed (or turned off) to form light dimming range IM1 are each of light-emitting elements 33*a* included within an area 110 shown by the dashed dotted line in FIG. 11A. In this case, as shown in FIG. 11B, light source 33 is controlled so that a few light-emitting elements 33*a* (shown by dotted lines in the figure) in the lower left corner of area 110 are subject to light dimming.

The light emitted from light source 33 controlled in this manner is inverted and projected by lens 34, thereby obtaining light dimming range IM1 which includes correction light 112*a*. Further, although illustration is omitted, light dimming range IM2 which includes correction light 112*b* is obtained by a similar control. Here, note that, for ease of understanding, the number of light-emitting elements 33*a* is shown as small, however when there are a greater number of light-emitting elements 33*a*, the number of light-emitting elements 33*a* subject to light dimming is determined according to the area required for correction lights 112*a*, 112*b*.

Figure 12A:
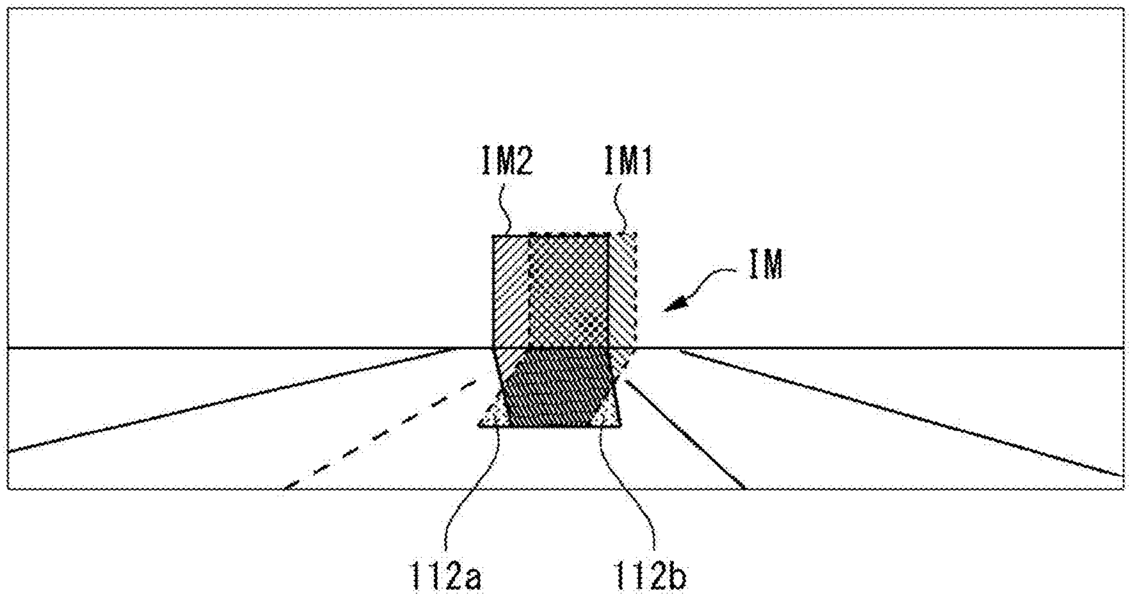
FIG. 12A is a diagram illustrating the shape on the road surface of the correction light that is irradiated to the left and right corners of the lower end of the combined light dimming range IM of adaptive driving beam BM.
Figure 12B:
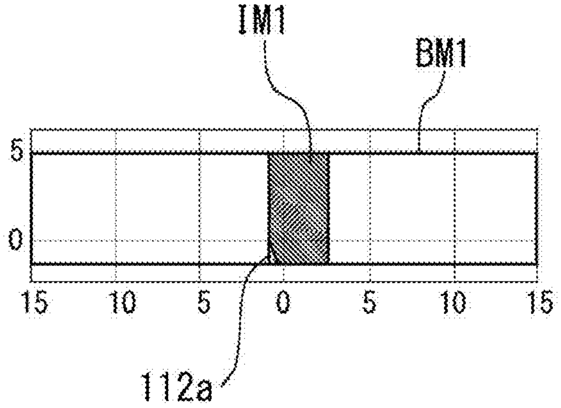
FIG. 12B is a diagram illustrating the shape of light dimming range IM1 on a screen.
Figure 12C:
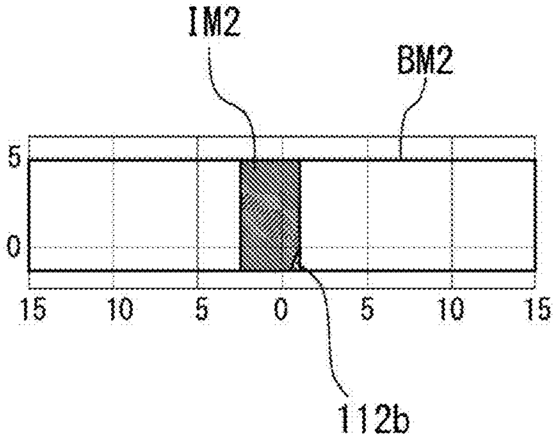
FIG. 12C is a diagram illustrating the shape of light dimming range IM2 on a screen.
Figure 12D:
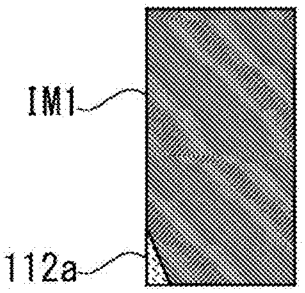
FIG. 12D is a partial enlarged view of light dimming range IM1.
Figure 12E:
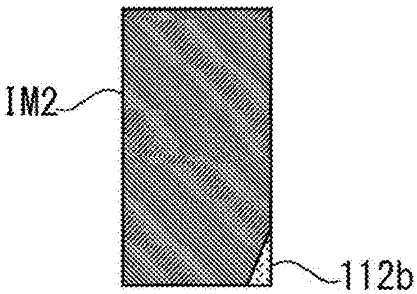
FIG. 12E is a partial enlarged view of light dimming range IM2.

FIG. 12A is a diagram illustrating the shape on the road surface of the correction light that is irradiated to the left and right corners of the lower end of the combined light dimming range IM of adaptive driving beam BM. FIG. 12B and FIG. 12C are diagrams illustrating the shapes of each light dimming range IM1, IM2 on a screen. FIG. 12D and FIG. 12E are partial enlarged views of each light dimming range IM1, IM2.

Compared to the example shown in FIG. 10A, each correction light 112*a*, 112*b* has a triangular shape that is longer in the up-down direction (vertical direction) and shorter in the left-right direction (horizontal direction) in the figure. As shown in this example, when the relative distance between the own vehicle and the forward vehicle changes (refer to FIG. 8), the shape (height and/or width) of each correction light 112*a*, 112*b* is variably set accordingly.

Here, even when the shape of each correction light 112*a*, 112*b* is set to be variable, it is preferable to set their upper end positions so that they do not exceed the horizon. This is to prevent glare to the forward vehicle caused by the combined light dimming range IM of adaptive driving beam BM to become unnecessarily narrow.

Figure 13A:
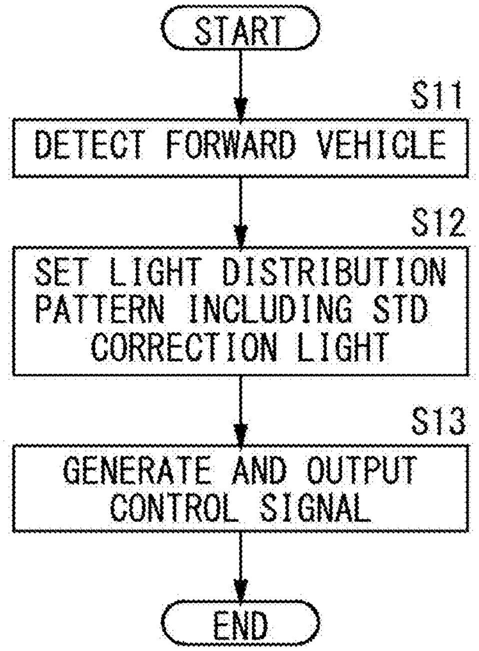
FIG. 13A to FIG. 13C are each a flowchart showing the operating procedure of a headlamp system.
Figure 13B:
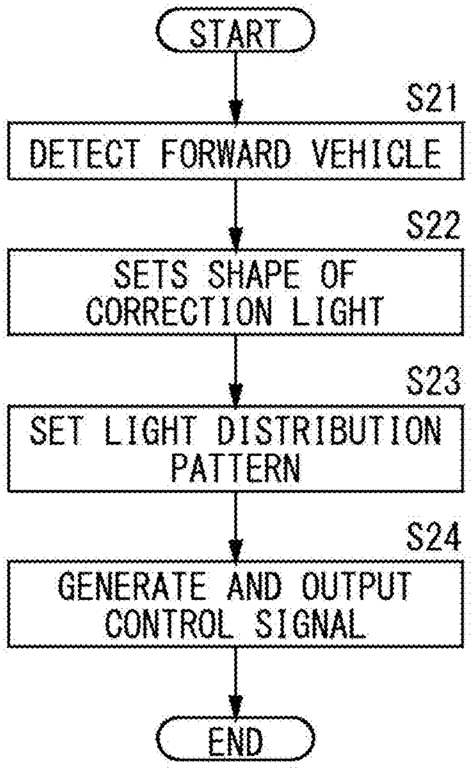
Figure 13C:
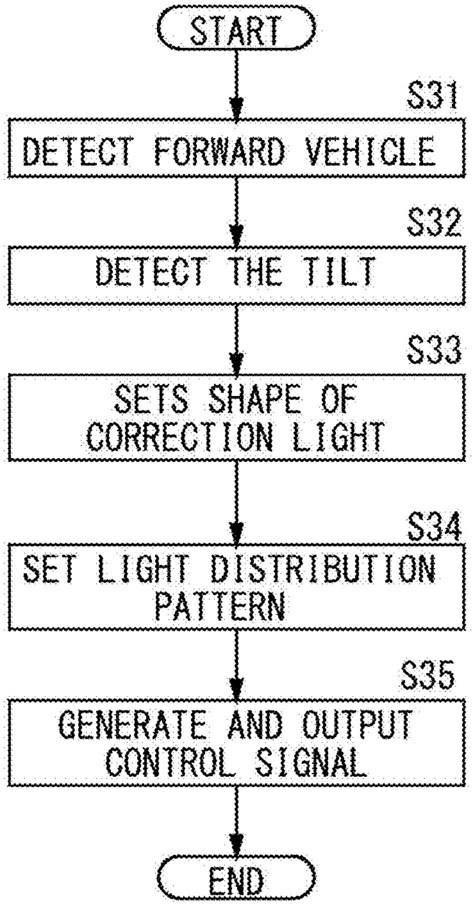

FIG. 13A to FIG. 13C are each a flowchart showing the operating procedure of a headlamp system. Here, note that the order of each process shown here can be changed as long as no contradictions or inconsistencies arise in the results of the information processing, and other processes not explicitly described here can also be added.

First, the operation procedure shown in FIG. 13A (operation procedure of a first mode), which is the simplest of the operation procedures shown among FIG. 13A to FIG. 13C will be described.

When a forward vehicle is detected by forward monitoring sensor 11 (step S11), vehicle ECU 10 sets a light distribution pattern including light dimming ranges IM1, IM2 according to the position of the detected forward vehicle. At this time, vehicle ECU 10 sets a light distribution pattern that includes irradiation ranges of standard correction lights 112*a*, 112*b* for at least the lower left and right corners of the light dimming range (step S12).

Here, a standard correction light is a correction light that is determined (designed) in advance based on the usage conditions (pitching angle and distance range) so that the effect of triangular shape illumination unevenness is reduced even when the relative distance or position between the own vehicle and the forward vehicle changes. For example, when the relative distance is 25 m to 100 m and the maximum pitching angle is 1.5 deg, the range can be set to a height H of 0.5 deg and a width W of 1.0 deg.

Once the light distribution pattern is set, lamp ECU 20 generates a control signal for realizing this light distribution pattern and outputs the signal to control device 21 (step S13). Control device 21 generates a drive signal based on the control signal and outputs the signal to each ADB unit 32L, 32R. Thereby, the operation of each ADB unit 32L, 32R is controlled, and adaptive driving beam BM is irradiated, which includes a combined light dimming range IM configured to include the light dimming ranges IM1, IM2, and correction lights 112*a*, 112*b*.

According to the operation procedure of the first mode, by using the standard correction light, since it is not necessary to perform calculations by taking into account the relative positional relationship and relative distance of the forward vehicle to the own vehicle, simplification of the calculation process can be achieved.

Next, the operation procedure shown in FIG. 13B (operation procedure of a second mode) will be described.

When a forward vehicle is detected by forward monitoring sensor 11 (step S21), vehicle ECU 10 sets shapes of correction lights 112*a*, 112*b* in accordance with the relative positional relationship and relative distance of the forward vehicle to the own vehicle (step S22).

Here, since the size of the triangular shaped illuminance unevenness reflected on the road surface (refer to FIG. 4, etc.) can be calculated in accordance with the relative distance and relative positional relationship between the own vehicle and the forward vehicle, the shapes of correction lights 112*a*, 112*b* can be determined according to the calculation result.

Specifically, the shapes of correction lights 112*a*, 112*b* are set so that, for example, the closer the relative distance between the own vehicle and the forward vehicle, the lower the vertical height and the wider the horizontal width becomes, and the greater the relative distance is, the higher the vertical height and the narrower the horizontal width becomes (refer to FIG. 10A and FIG. 12A).

Further, the shapes of correction lights 112*a*, 112*b* are set so that, for example, when the forward vehicle is located relatively to the left of the own vehicle, the width of the correction light on the lower left side of the light dimming range is set to become narrower than the width of the correction light on the lower right side of the light dimming range, and when the forward vehicle is located relatively to the right of the own vehicle, the width of the correction light on the lower right side of the light dimming range is set to become narrower than the width of the correction light on the lower left side of the light dimming range.

Next, vehicle ECU 10 sets a light distribution pattern which includes light dimming ranges IM1, IM2 according to the detected position of the forward vehicle, and includes the irradiation ranges of correction lights 112*a*, 112*b* whose shapes has been set in step S22 (step S23).

Once the light distribution pattern is set, lamp ECU 20 generates a control signal for realizing this light distribution pattern and outputs the signal to control device 21 (step S24). Control device 21 generates a drive signal based on the control signal and outputs the signal to each ADB unit 32L, 32R. Thereby, the operation of each ADB unit 32L, 32R is controlled, and adaptive driving beam BM is irradiated, which includes a combined light dimming range IM configured to include the light dimming ranges IM1 and IM2, and correction lights 112*a*, 112*b*.

According to the operation procedure of the second mode, the shapes of the correction light is set taking into consideration the relative positional relationship and relative distance of the forward vehicle to the own vehicle, thereby illuminance unevenness can be suppressed more effectively.

Next, the operation procedure shown in FIG. 13C (operation procedure of a third mode) will be described.

When a forward vehicle is detected by forward monitoring sensor 11 (step S31), vehicle ECU 10 detects the tilt of the own vehicle in the pitch direction based on the signal output from tilt detection sensor 12 (step S32).

Next, vehicle ECU 10 sets the shapes of correction lights 112*a*, 112*b* according to the relative positional relationship and relative distance of the forward vehicle to the own vehicle, and the tilt angle of the own vehicle (step S33).

Here, the shapes of correction lights 112*a*, 112*b* are set by further taking into consideration the tilt angle of the own vehicle, so that the size of illuminance unevenness can be calculated with greater accuracy.

Next, vehicle ECU 10 sets a light distribution pattern which includes light dimming ranges IM1, IM2 according to the detected position of the forward vehicle and the irradiation ranges of correction lights 112*a*, 112*b* whose shapes have been set in step S33 (step S34).

Once the light distribution pattern is set, lamp ECU 20 generates a control signal for realizing this light distribution pattern and outputs the signal to control device 21 (step S35). Control device 21 generates a drive signal based on the control signal and outputs the signal to each ADB unit 32L, 32R. Thereby, the operation of each ADB unit 32L, 32R is controlled, and adaptive driving beam BM is irradiated, which includes a combined light dimming range IM configured to include the light dimming ranges IM1, IM2, and correction lights 112*a*, 112*b*.

According to the operation procedure of the third mode, the shape of the correction light is set taking into consideration the relative positional relationship and relative distance of the forward vehicle to the own vehicle, and the tilt angle of the own vehicle, thereby illuminance unevenness can be suppressed more effectively.

According to the above embodiment, when the light dimming range is set for an object to be dimmed using the ADB function in the left-side variable light distribution unit (left lamp) and the right-side variable light distribution unit (right lamp), it is possible to reduce illuminance unevenness caused by the difference in the relative angle between the object to be dimmed and the positions of the left-side variable light distribution unit and the right-side variable light distribution unit.

Here, note that the present disclosure is not limited to the content of the above described embodiment, and various modifications can be made within the scope of the gist of the present disclosure. For example, in the above embodiment, correction light is added to the lower end side of the light dimming range, but the correction light may also be added to the upper end side of the light dimming range.

Figure 14A:
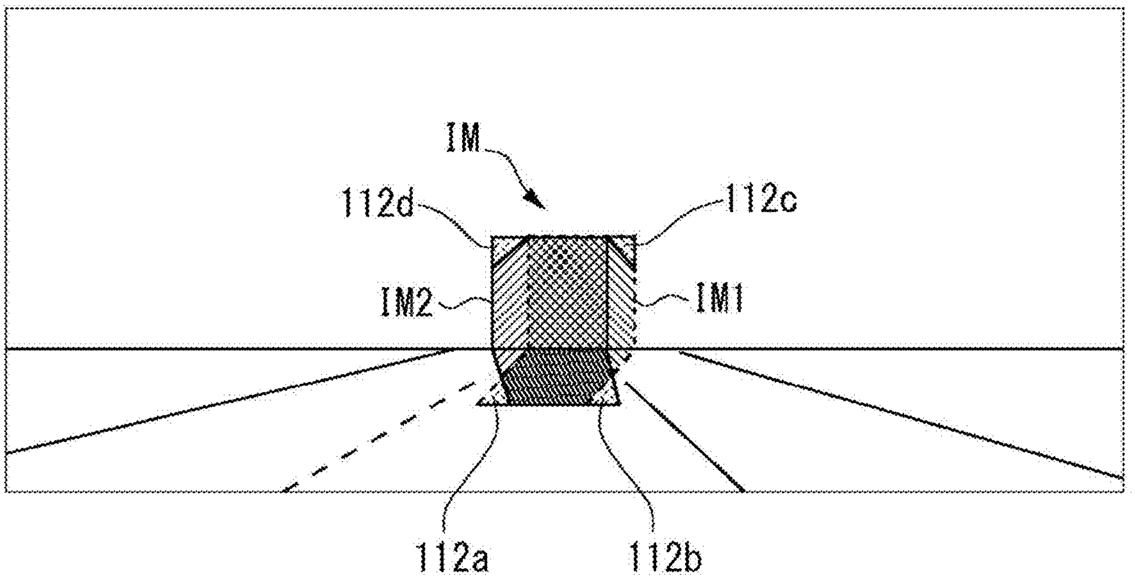
FIG. 14A is a diagram illustrating the shape on the road surface of the correction light irradiated to the left and right corners of the lower and upper ends of the combined light dimming range IM of adaptive driving beam BM in a modified embodiment.
Figure 14B:
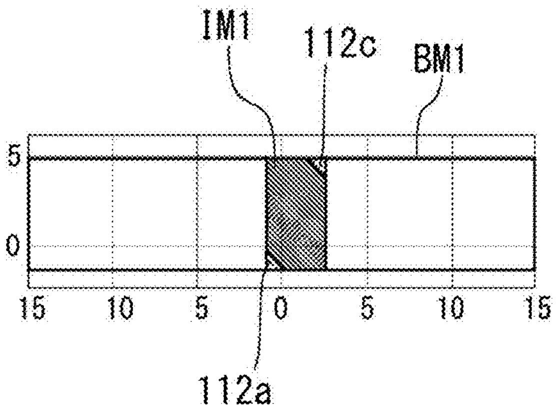
FIG. 14B is a diagram illustrating the shape of light dimming range IM1 on a screen.
Figure 14C:
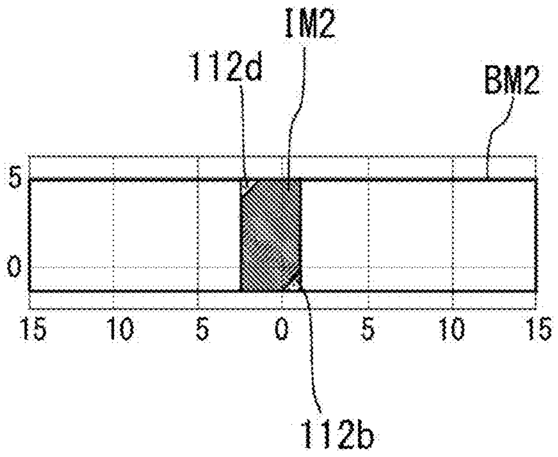
FIG. 14C is a diagram illustrating the shape of light dimming range IM2 on a screen.
Figure 14D:
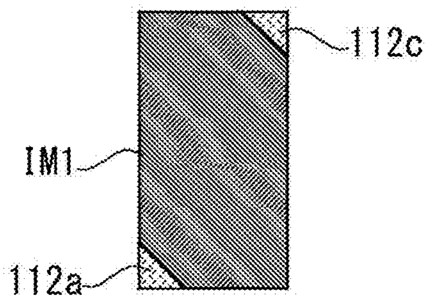
FIG. 14D is a partial enlarged view of light dimming range IM1.
Figure 14E:
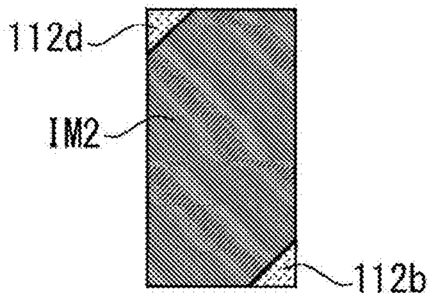
FIG. 14E is a partial enlarged view of light dimming range IM2.

FIG. 14A is a diagram illustrating the shape on the road surface of the correction light irradiated to the left and right corners of the lower and upper ends of the combined light dimming range IM of adaptive driving beam BM in a modified embodiment described above. FIG. 14B and FIG. 14C are diagrams illustrating the shapes of each light dimming range IM1, IM2 on a screen. FIG. 14D and FIG. 14E are partial enlarged views of each light dimming range IM1, IM2. In this modified embodiment, as shown in FIG. 14B and FIG. 14D, with regard to the shape on the screen, correction light 112*a* is irradiated to the left corner of the lower end of light dimming range IM1, and the correction light 112*c* is irradiated to the right corner of the upper end of light dimming range IM1. Similarly, as shown in FIG. 14C and FIG. 14E, with regard to the shape on the screen, correction light 112*b* is irradiated to the right corner of the lower end of light dimming range IM2, and a correction light 112*d* is irradiated to the left corner of the upper end of light dimming range IM2.

As the shape on the road surface is shown in FIG. 14A, correction lights 112*a* and 112*b* are irradiated with an irradiation range set at the left and right corners of the lower end of the combined light dimming range, which is configured as a range including light dimming range IM1 and light dimming range IM2, at a position closer to the own vehicle than the forward vehicle (the object). Similarly, correction lights 112*c* and 112*d* are irradiated with an irradiation range set at the left and right corners of the upper end of the combined light dimming range, which is obtained by overlapping light dimming range IM1 and light dimming range IM2, at a position farther from the own vehicle than the forward vehicle. As in this modified embodiment, by adding each correction light 112*c*, 112*d*, light dimming range in the air which is not necessarily important can be reduced, thereby reducing discomfort that may be felt by the driver.

The present application is based on, and claims priority from, JP Application Serial Number, 2024-9644 filed on Jan. 25, 2024, the disclosure of which is hereby incorporated by reference herein in its entirety.

DESCRIPTION OF SYMBOLS

10: Vehicle ECU
11: Forward monitoring sensor
12: Tilt detection sensor
13: Lamp
20: Lamp ECU
21: Control device
31L, 31R: Low beam unit
32L, 32R: ADB unit
BM, BM1, BM2: Adaptive driving beam
IM: Combined light dimming range
IM1, IM2: Light dimming range
112*a*, 112*b*: Correction light
100: Own vehicle
101: Forward vehicle

What is claimed is:

1. A control apparatus for a headlamp having a left-side variable light distribution unit and a right-side variable light distribution unit respectively disposed on left and right sides of the front of a vehicle, in which irradiation lights formed by the left-side variable light distribution unit and the right-side variable light distribution unit overlap in front of the vehicle to form a combined irradiation light in front of the vehicle, the control apparatus comprising:

a forward monitoring sensor whose function is to detect an object present in front of the vehicle, and a controller connected to the headlamp and the forward monitoring sensor and controls the operation of the headlamp, wherein the controller is configured to perform:

in accordance with the position of the object detected by the forward monitoring sensor, to set a first light dimming range in an irradiation range of the left-side variable light distribution unit, and to set a second light dimming range in an irradiation range of the right-side variable light distribution unit;

to set an irradiation range of a first correction light in the left corner of the lower end of a first combined light dimming range that is configured as a range including the first light dimming range and the second light dimming range at a position closer to the vehicle than the object, and to set an irradiation range of a second correction light in the right corner of the lower end of the first combined light dimming range; and to provide control signals to the left-side variable light distribution unit and the right-side variable light distribution unit of the headlamp to realize the combined irradiation light which includes the first light dimming range, the second light dimming range, the irradiation range of the first correction light, and the irradiation range of the second correction light.

2. The control apparatus for a headlamp according to claim 1, wherein the first light dimming range and the second light dimming range have a substantially rectangular shape when viewed in the direction of travel of the vehicle on a screen hanging down in front of the vehicle.

3. The control apparatus for a headlamp according to claim 1, wherein the first correction light is irradiated by the left-side variable light distribution unit, and the second correction light is irradiated by the right-side variable light distribution unit.

4. The control apparatus for a headlamp according to claim 2, wherein height and/or width of the irradiation range of each of the first correction light and the second correction light as viewed in the direction of travel of the vehicle on the screen is set based on relative distance of the object and/or relative positional relationship of the object.

5. The control apparatus for a headlamp according to claim 2, wherein height and/or width of the irradiation range of each of the first correction light and the second correction light as viewed in the direction of travel of the vehicle on the screen is set based on tilt of the vehicle in the pitch direction.

6. The control apparatus for a headlamp according to claim 2, wherein the irradiation ranges of the first correction light and the second correction light are provided in a substantially triangular shape on the screen at the left and right corners of the lower end of the first combined light dimming range, as viewed in the direction of travel of the vehicle.

7. The control apparatus for a headlamp according to claim 1, wherein the controller is configured to perform:

to set an irradiation range of a third correction light in the left corner of the upper end of a second combined light dimming range configured as a range including the first light dimming range and the second light dimming range at a position farther from the vehicle than the object, and to set an irradiation range of a fourth correction light in the right corner of the upper end of the second combined light dimming range; and to provide control signals to the left-side variable light distribution unit and the right-side variable light distribution unit of the headlamp to realize the combined irradiation light including the first light dimming range, the second light dimming range, the irradiation range of the first correction light, the irradiation range of the second correction light, the irradiation range of the third correction light, and the irradiation range of the fourth correction light.

8. A headlamp system comprising:

the control apparatus for a headlamp according to claim 1, and and a headlamp capable of variable light distribution which is connected to the control apparatus.

9. A control method for a headlamp performed by a controller to control the headlamp having a left-side variable light distribution unit and a right-side variable light distribution unit respectively disposed on left and right sides of the front of a vehicle, in which irradiation lights formed by the left-side variable light distribution unit and the right-side variable light distribution unit overlap in front of the vehicle to form a combined irradiation light in front of the vehicle, wherein the controller is configured to perform:

in accordance with the position of an object present in front of the vehicle, to set a first light dimming range in an irradiation range of the left-side variable light distribution unit, and to set a second light dimming range in an irradiation range of the right-side variable light distribution unit;

to set an irradiation range of a first correction light in the left corner of the lower end of a first combined light dimming range that is configured as a range including the first light dimming range and the second light dimming range at a position closer to the vehicle than the object, and to set an irradiation range of a second correction light in the right corner of the lower end of the first combined light dimming range; and to provide control signals to the left-side variable light distribution unit and the right-side variable light distribution unit of the headlamp to realize the combined irradiation light which includes the first light dimming range, the second light dimming range, the irradiation range of the first correction light, and the irradiation range of the second correction light.

* * * * *